Feb. 26, 1929.

J. B. PINHEIRO 1,703,208

BABY CARRIAGE

Original Filed Nov. 9, 1922  3 Sheets-Sheet 1

INVENTOR.
JOHN B. PINHIERO.
BY
ATTORNEYS.

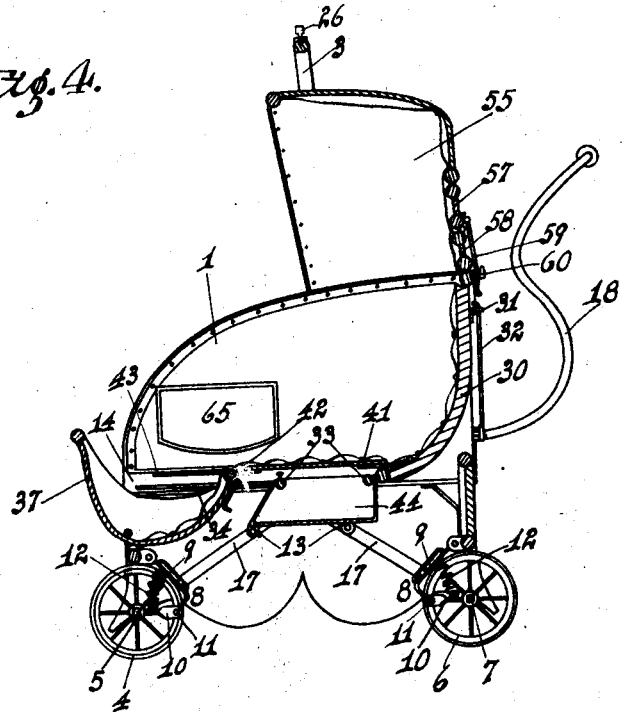

Feb. 26, 1929.
J. B. PINHEIRO
1,703,208
BABY CARRIAGE
Original Filed Nov. 9, 1922    3 Sheets-Sheet 3
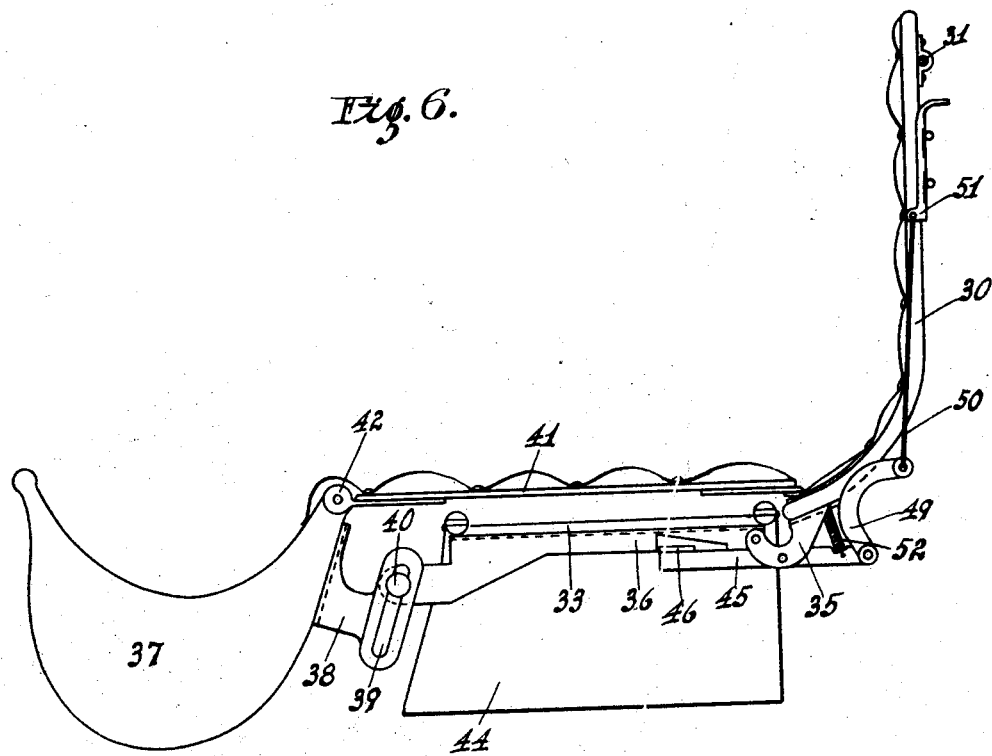
INVENTOR
JOHN B. PINHEIRO.
BY
ATTORNEY Patented Feb. 26, 1929.

1,703,208

UNITED STATES PATENT OFFICE.

JOHN B. PINHEIRO, OF OAKLAND, CALIFORNIA.

BABY CARRIAGE.

Original application filed November 9, 1922, Serial No. 599,791. Divided and this application filed April 27, 1925. Serial No. 26,322.

My invention is a baby carriage and pertains to the collapsible or folding features. These features comprise a seat, back, and foot rest structure which may be folded into different positions.

This application is a division of my application for baby carriage, Serial No. 599,791 filed November 9, 1922.

An object of the invention as described herein is to provide a mechanism by which the seat, the foot rest, and the back may be moved into relatively different positions and pertains to the particular features for accomplishing this purpose. In my construction, the back rest and the foot rest, may be moved substantially horizontally in reference to the seat portion and a folding canopy may be extended over the whole of the bed thus formed.

My invention will more readily be understood from the following description and drawings:—

Figure 4 is a sectional view taken on the line 4—4 of Figure 3.

Figure 5 is a bottom plan view.

Figure 6 is an enlarged side view of the seat adjustment.

Figure 7 is a bottom plan view of the same, and

Figure 8 is a side view of the seat adjustment catch.

Figure 1:
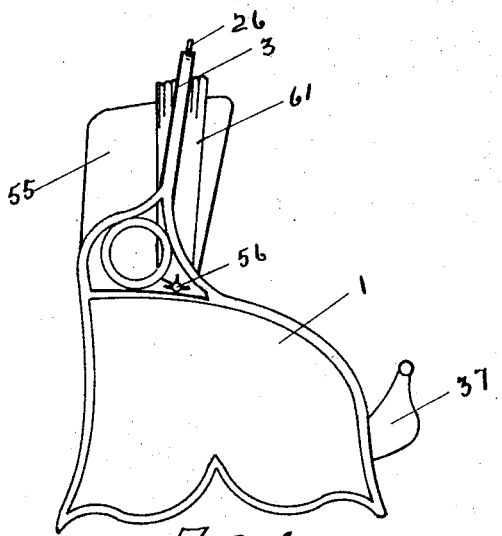
Figure 1 is a side view of my carriage with the wheels folded and the top raised.

Referring more particularly to the drawings, the numerals 1 and 2 indicate the sides of my carriage which are joined by handle 3. The front wheels 4 are mounted on axle 5, and the rear wheels 6 are mounted on axle 7. The axles 5 and 7 are secured to a pair of swing frames 8, which consist of members 9 and 10 pivoted together at 11. The axles 5 and 7 are each secured to the forward end of a pair of lower members 10 and the upper members 9 are each pivoted at their upper ends to the sides 1 and 2. Springs 12 are positioned between the members 9 and 10 to relieve any jar or bumps. Handle 18 is utilized to operate the wheel retracting mechanism which features are embodied in the main application above mentioned.

The folding back, seat and foot rest features are as follows:

A back rest 30 is mounted between the sides 1 and 2 and is adjustably supported by a rod 31 secured thereto and which encircles a pair of guide rods 32 secured to the sides 1 and 2. The back 30 slides vertically on the rods 32. A seat frame 33 is mounted between the sills 14 and is slidable in grooves 34 in said sills. A pair of brackets 35 are secured to the back 30 and are pivoted to edge members 36 on the seat frame 33.

A foot rest 37 is mounted forwardly of the seat frame 33. A rearwardly extending bracket 38 is secured at either side of the foot rest 37 and a slot 39 is formed therein. Pins 40 fit into the slots 39 and said pins project from the edge members 36. A seat 41 is pivoted to the foot rest 37 at 42 and the rear edge thereof rests upon the lower end of the back 30. The pivot 42 is slidably mounted in slots 43 in the sills 14. A receptacle 44 is secured to the frame 33 below the seat 41 and it may be extended by raising the seat.

Figure 2:
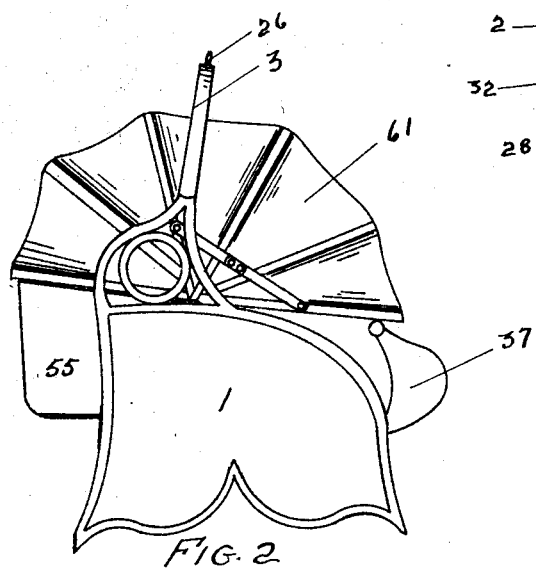
Figure 2 is a side view of my carriage in a folded position and with the canopy raised.

A latch lever 45 is pivoted to the bracket 35 and has an engaging member 46 formed on one end thereof. Secured to the lower side of the sill 14 is a plate 47 which has notches 48 formed therein, into which the engaging member 46 is adapted to fall. A link 49 is pivoted to the rear of the lever 45 and secured to the link is a flexible cable 50 which is also secured to a control plate 51. The control plate 51 is slidably mounted to the rear of the back 30. A spring 52 is positioned between the lever 45 and the back 30 to keep said lever into engagement with the notches 48. The operation of the seat is as follows:

With the seats in the position shown in Figure 6, the plate 51 is raised which causes the lever 45 to tip and pull the engaging member 46 out of a notch 48. The back 30 may now be pushed downward and the lower end slides horizontally in the groove 43. This horizontal movement also moves the seat frame 33 forwardly which causes the foot rest 37 to move upwardly on the hinge 42. The engaging member 46 falls in the forward notch 48 and holds the seat, back and foot rest in the position described. Figure 2 shows the raised position of the foot rest 37.

A hood 55 is pivoted to the sides 1 and 2 at 56. A plate 57 which extends across the rear of the hood 55 is hinged thereto and a second plate 58 is hinged to the lower edge of the plate 57. The hood 55 is held in a raised position by a latch 59 which is engaged by a pin 60 secured to the back 30. The hood may be lowered by releasing the latch 59 and pushing the plates 57 and 58 inwardly. It will be seen that the hood 55 can only be raised when the seat back 30 is in its highest position (Fig. 4). If a covering is desired at any other time I provide a folding canopy 61. The canopy 61 is also pivoted to the sides 1 and 2 at 56. Pockets 65 are provided in the sides 1 and 2.

It must be seen that the seat, back, and the foot rest may be readily moved into different positions and that they can be maintained substantially in alignment so that with the usual bedding and the like a comfortable bassinet is made from the baby carriage and that the canopy 61 may be extended over the whole bed thus formed.

My invention may be considerably modified and may be utilized in baby carriages having other types of retracting wheels or with stationary wheels if desired. It will also be understood that various equipments may be utilized for simultaneously moving the back, the seat, and the foot rest within the scope of my claims.

Figure 3:
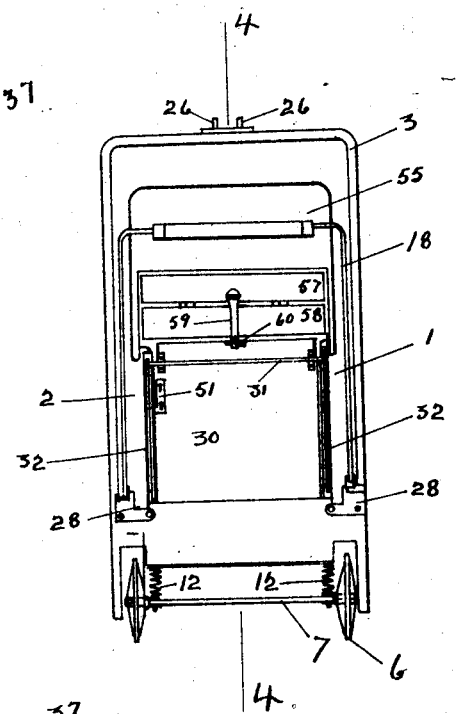
Figure 3 is a rear view of the carriage.

In swinging the parts shown in Figure 4 into a position for forming a bed, the hood 55 is first swung into the position shown in Figure 2 and then the control plate 51 is manually actuated, this plate releasing the engaging member 46 and permitting the back 30 to be swung downwardly. Figure 3 shows how the back 30 carries a rod 31, this rod in turn being slidably mounted on guide rods 32. Guide rods 32 are carried by the sides 1 and 2. The rod 31 moves in substantially a vertical plane when being lowered. This causes the portion of the back 30 disposed adjacent to the seat 41, to move in a horizontal plane, moving the seat 41 therewith and causing the foot rest 37 to move into the position shown in Figure 2. The rod 31 upon reaching the lower ends of the guide rods 32, stops the further swinging of the back 30 and supports the back. The back 30, when in this position, is inclined at a slight angle with respect to a horizontal plane.

Having described my invention, what I claim is:

1. In a carriage having sides, a pair of sills supported from said sides, a seat frame slidably mounted on said sills, a seat carried by said seat frame, a back, a pair of vertical rods upon which said back is slidably mounted, a pair of brackets secured to the back and pivotally connected to the seat frame, said back being lowerable into substantial alignment with the seat, thereby sliding said seat frame on the sills.

2. In a carriage as claimed in claim 1, having a foot rest pivotally connected to the seat, and means to swing said foot rest into substantial alignment with the seat.

3. In a carriage having sides, a pair of sills supported from said sides, a seat frame slidably mounted on said sills, a seat carried by said seat frame, a back, a pair of vertical rods upon which said back is slidably mounted, a pair of brackets secured to the back and pivotally connected to the seat frame, said back being lowerable into substantial alignment with the seat, thereby sliding said seat frame on the sills, a foot rest pivotally connected to the seat, and means to swing said foot rest into substantial alignment with the seat on the sliding movement of the frame seat.

4. In a carriage as claimed in claim 3, a control plate connected to the back, a link operatively connected with the sliding seat frame and a flexible cable connecting the control plate and the link to permit the movement of the said sliding seat frame and the folding of said back and of said foot rest.

5. A device of the type described comprising supporting sills, a seat frame movably carried by said sills, a seat, a back, a foot rest, and means operatively connecting said back and said foot rest with said frame, for causing said foot rest to swing into a substantially horizontal position when said back is swung into a substantially horizontal position.

In testimony whereof I affix my signature.

JOHN B. PINHEIRO.